(12) United States Patent
Wu

(10) Patent No.: US 10,834,784 B2
(45) Date of Patent: Nov. 10, 2020

(54) DATA TRANSMISSION PROCESS OF HETEROGENEOUS LWA NETWORK AND ASSOCIATED BASE STATION FOR MOBILE COMMUNICATION

(71) Applicant: Alpha Networks Inc., Hsinchu (TW)

(72) Inventor: Sih Hong Wu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 11 days.

(21) Appl. No.: 16/221,691

(22) Filed: Dec. 17, 2018

(65) Prior Publication Data
US 2020/0163158 A1    May 21, 2020

(30) Foreign Application Priority Data
Nov. 15, 2018   (TW) .............................. 107140630 A

(51) Int. Cl.
| | | |
|---|---|---|
| *H04W 88/10* | (2009.01) | |
| *H04W 24/08* | (2009.01) | |
| *H04L 12/26* | (2006.01) | |
| *H04W 80/02* | (2009.01) | |
| *H04W 84/12* | (2009.01) | |
| *H04W 80/08* | (2009.01) | |

(52) U.S. Cl.
CPC .............. *H04W 88/10* (2013.01); *H04L 43/16* (2013.01); *H04W 24/08* (2013.01); *H04W 80/02* (2013.01); *H04W 80/08* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2017/0099625 A1* | 4/2017 | Li | ......................... | H04W 28/08 |
| 2018/0124642 A1* | 5/2018 | Phuyal | ................. | H04W 24/10 |
| 2018/0132143 A1* | 5/2018 | Sirotkin | ............ | H04W 72/1215 |
| 2018/0262465 A1* | 9/2018 | Maattanen | ............ | H04W 76/12 |

(Continued)

FOREIGN PATENT DOCUMENTS

WO    2018000228    1/2018

OTHER PUBLICATIONS

Taiwan Intellectual Property Office, "Office Action", dated Sep. 5, 2019.

*Primary Examiner* — Otis L Thompson, Jr.
(74) *Attorney, Agent, or Firm* — WPAT, PC

(57) ABSTRACT

In a data transmission process of a heterogeneous LWA network, the base station device receives a series of data packets and a signal intensity information. A communication address of each of the series of data packet is directed to a specified user mobile device, and the signal intensity information indicates an intensity of a signal transmitted between the specified user mobile device and a wireless network access point device in communication with the base station device and the specified user mobile device. If the signal intensity information complies with a first specific condition and a status of data transmission associated with the user mobile device complies with a second specific condition, partial data packets are assigned to be transferred to the user mobile device by the wireless network access point device, and partial data packets are assigned to be transferred to the user mobile device by the base station device.

16 Claims, 11 Drawing Sheets

(56) References Cited

U.S. PATENT DOCUMENTS

| | | |
|---|---|---|
| 2018/0295572 A1* | 10/2018 | Bhattacharya ........ H04W 48/20 |
| 2018/0343578 A1* | 11/2018 | Yeoh ................. H04W 36/0085 |
| 2019/0028916 A1* | 1/2019 | Kashyap ............. H04W 72/048 |
| 2019/0058993 A1* | 2/2019 | Yu ....................... H04W 84/045 |
| 2019/0082343 A1* | 3/2019 | Shih ..................... H04W 24/10 |
| 2019/0141579 A1 | 5/2019 | Hong |
| 2019/0182841 A1* | 6/2019 | Soldati ................. H04W 24/10 |

* cited by examiner

DATA TRANSMISSION PROCESS OF HETEROGENEOUS LWA NETWORK AND ASSOCIATED BASE STATION FOR MOBILE COMMUNICATION

FIELD OF THE INVENTION

The present invention relates to a data transmission process, and more particularly to a data transmission process of a heterogeneous LWA network. The present invention also relates to an associated base station for mobile communication.

BACKGROUND OF THE INVENTION

Please refer to FIG. 1A, which is a scheme illustrating a prior-art mobile communication system, wherein a base station device 10 for mobile communication is capable of communicating with multiple user equipments (UEs), e.g. EUs 111, 112, etc., which are located within a communication range of the base station device 10. The base station device 10 may be an Evolved Node B (hereinafter referred to as eNB) defined in the mobile communication specification, and in a Long Term Evolution (LTE) system, the base station device 10 may be an Evolved Universal Terrestrial Radio Access (Network) Node B (hereinafter referred to as E-UTRAN Node B). The base station 10 has a signal coverage range 100 as illustrated in FIG. 1A. The user mobile devices 111 and 112 may be personal mobile devices such as smart phones. In addition, as can be seen from the figure, in the range 100 covered by the base station device 10, a wireless network access point device 121 is provided to work with the base station device 10 as a heterogeneous network for mobile communication, e.g. a heterogeneous network utilizing an LWA networking technology. The heterogeneous LWA networking technology is a Long Term Evolution-Wireless Local Area Networks (LTE-WLAN) Aggregation technology, in which two different wireless technology resources LTE and WLAN are aggregated. The wireless network access point device 121 has a signal coverage range 1210, within which the user mobile devices 111 and 112 may also communicate with the wireless network access point device 121.

Conventionally, a telecommunication provider needs to maintain and monitor the status of both the wireless local area network access point device 121 and the base station device 10 in order to enable the user mobile devices 111 and 112 to connect to the Internet anytime anywhere. However, at the same time, each of the user mobile devices 111 and 112 can only use one of the wireless technologies to perform data transmission on the network. As a result, redundant maintenance and monitoring work would cause a waste of resources.

Therefore, a heterogeneous LWA base station 20 is developed to remedy the deficiency. The heterogeneous LWA base station 20 practices the heterogeneous LWA networking technology under a tight coupling system architecture 201 between the wireless local area network access point device 121 and the base station device 10, as illustrated in FIG. 1B. As illustrated, the heterogeneous LWA base station 20 is coupled to the Internet 22 via a core network 21. Furthermore, the communication between the wireless local area network access point device 121 and the core network 21 is conducted under a loose coupling system architecture via an Evolved Packet Data Gateway/Trusted Wireless Access Gateway (ePDG/TWAG) module 23. On the other hand, there is no direct signal coupling between the wireless local area network access point device 121 and the Internet 22. In such a cooperative system, the telecom provider does not need to monitor the external status of the WLAN equipment since all the data can be transmitted and managed by the LTE core network. The heterogeneous LWA networking technology can thus be successfully applied with enhanced efficiency. Moreover, in addition to the equipment that is primitively used in the WLAN technology, the equipment primitively used in the LTE technology may also be used in the WLAN part. Therefore, the resource utilization rate can be improved.

However, when multiple user equipments (UEs) simultaneously use the LWA technology in the same wireless network (WiFi) environment, the multiple user equipments would rush to the same wireless network. The entire system still suffers from unsatisfactory or unstable data transmission performance.

SUMMARY OF THE INVENTION

Therefore, the present invention provides a data transmission process of a heterogeneous LWA network for use with at least a user mobile device, at least a wireless network access point device, and a base station device for mobile communication. The data transmission process according to the present invention solves the problem of unsatisfactory or unstable data transmission performance. The process comprises: receiving a series of data packets and a signal intensity information, wherein a communication address of each of the series of data packet is directed to the user mobile device, and the signal intensity information indicates an intensity of a signal transmitted between the user mobile device and the wireless network access point device; and assigning partial data packets to be transferred to the user mobile device by the wireless network access point device, and assigning partial data packets to be transferred to the user mobile device by the base station device if the signal intensity information complies with a first specific condition and a status of data transmission associated with the user mobile device complies with a second specific condition.

In an embodiment, it is determined that the signal intensity information complies with the first specific condition when the intensity of the signal is greater than a default threshold.

In an embodiment, it is determined that the status of data transmission associated with the user mobile device complies with the second specific condition when a time duration from a receiving time of a first one of the series of data packets to a receiving time of a second one of the series of data packets is less than a default threshold, and meanwhile, each of the data packets received at and between the first one and the second one has a size greater than a default threshold.

In an embodiment, when the time duration from the receiving time of the first one of the series of data packets to the receiving time of the second one of the series of data packets is not less than the default threshold or at least one of the data packets received at and between the first one and the second one has a size smaller than the default threshold, further comprising a step of determining whether another time duration from a receiving time of a third one of the series of data packets to a receiving time of a fourth one of the series of data packets is less than the default threshold, wherein a number of data packets between the third one of the series of data packets and the fourth one of the series of data packets is equal to a number of data packets between the first one of the series of data packets and the second one of the series of data packets.

In an embodiment, the series of data packets are transferred to the user mobile device by the base station device if the status of data transmission associated with the user mobile device does not comply with the second specific condition.

In an embodiment, the step of assigning partial data packets to be transferred to the user mobile device by the wireless network access point device, and assigning partial data packets to be transferred to the user mobile device by the base station device is conducted by assigning a first portion of data packets to be transferred to the user mobile device by the wireless network access point device, and assigning a subsequent second portion of data packets to be transferred to the user mobile device by the base station device.

In another embodiment, after the second portion of data packets is assigned to be transferred to the user mobile device by the base station device, a subsequent third portion of data packets is assigned to be transferred to the user mobile device by the wireless network access point device, and a further subsequent fourth portion of data packets is assigned to be transferred to the user mobile device by the base station device.

In a further embodiment, after the second portion of data packets is assigned to be transferred to the user mobile device by the base station device, a subsequent third portion of data packets is assigned to be transferred to the user mobile device by another wireless network access point device, which is in communication with the base station and the user mobile device, and has a signal intensity information complying with the first specific condition.

The present invention further provides a base station for mobile communication for use with at least one user mobile device and at least one wireless network access point device. The base station comprises: a node device in communication with the Internet, the user mobile device and the wireless network access point device, receiving a series of data packets and a signal intensity information, wherein a communication address of each of the series of data packet is directed to the user mobile device, and the signal intensity information indicates an intensity of a signal transmitted between the user mobile device and the wireless network access point device; and a distribution estimator in communication with the node device and the wireless network access point device, determining whether the signal intensity information complies with a first specific condition and a status of data transmission associated with the user mobile device complies with a second specific condition or not, wherein partial data packets are assigned to be transferred to the user mobile device by the wireless network access point device, and partial data packets are assigned to be transferred to the user mobile device by the base station device if the signal intensity information complies with the first specific condition and the status of data transmission associated with the user mobile device complies with the second specific condition.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
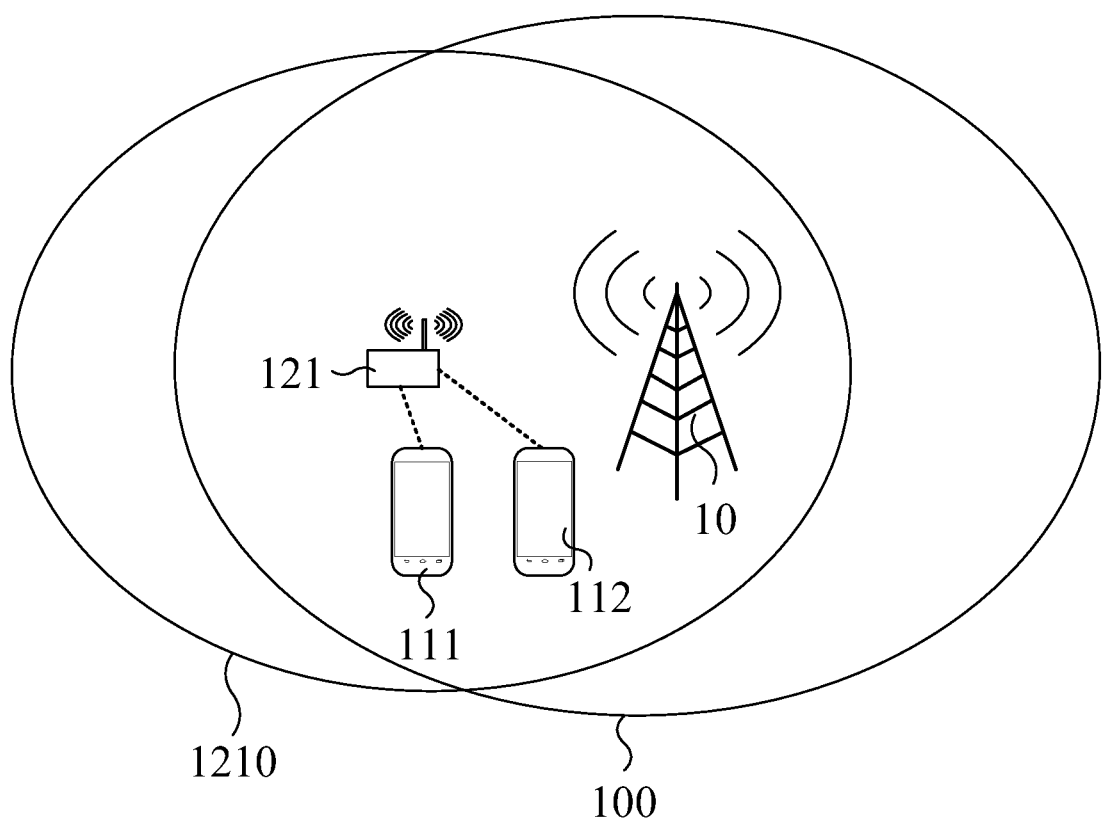
FIG. 1A is a scheme illustrating a prior-art communication system.
Figure 1B:
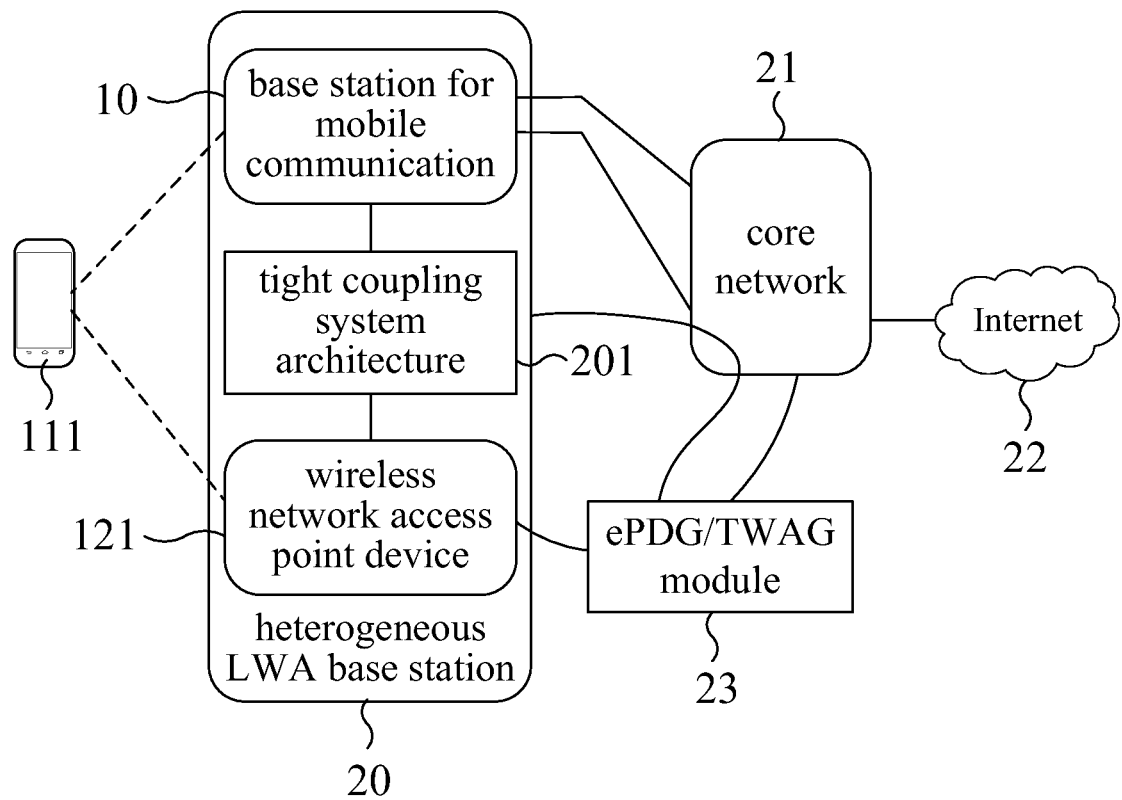
FIG. 1B is a functional block diagram schematically illustrating a prior-art communication system.
Figure 2:
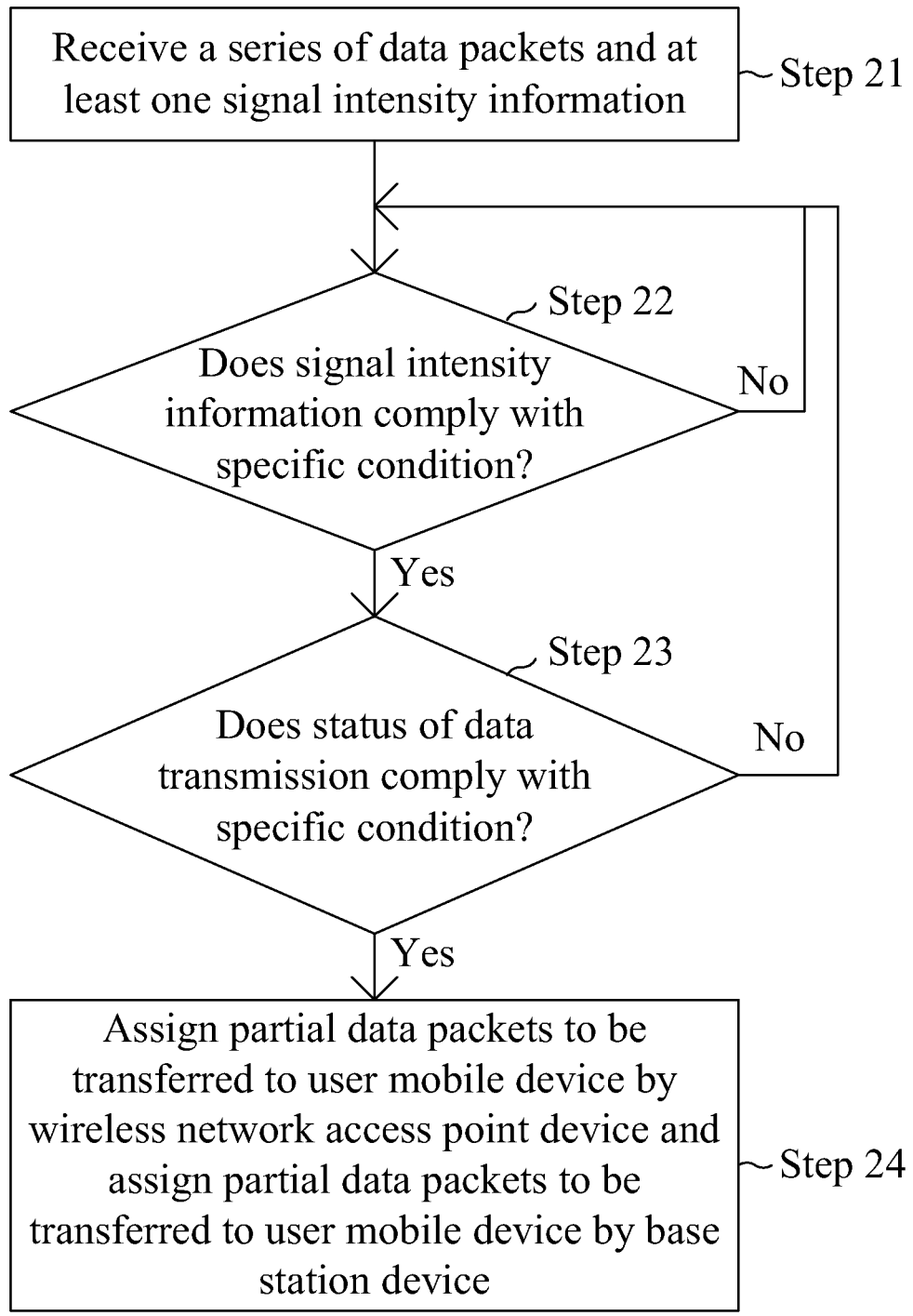
FIG. 2 is a flowchart schematically illustrating a data transmission process of a heterogeneous LWA network according to an embodiment of the present invention.
Figure 3:
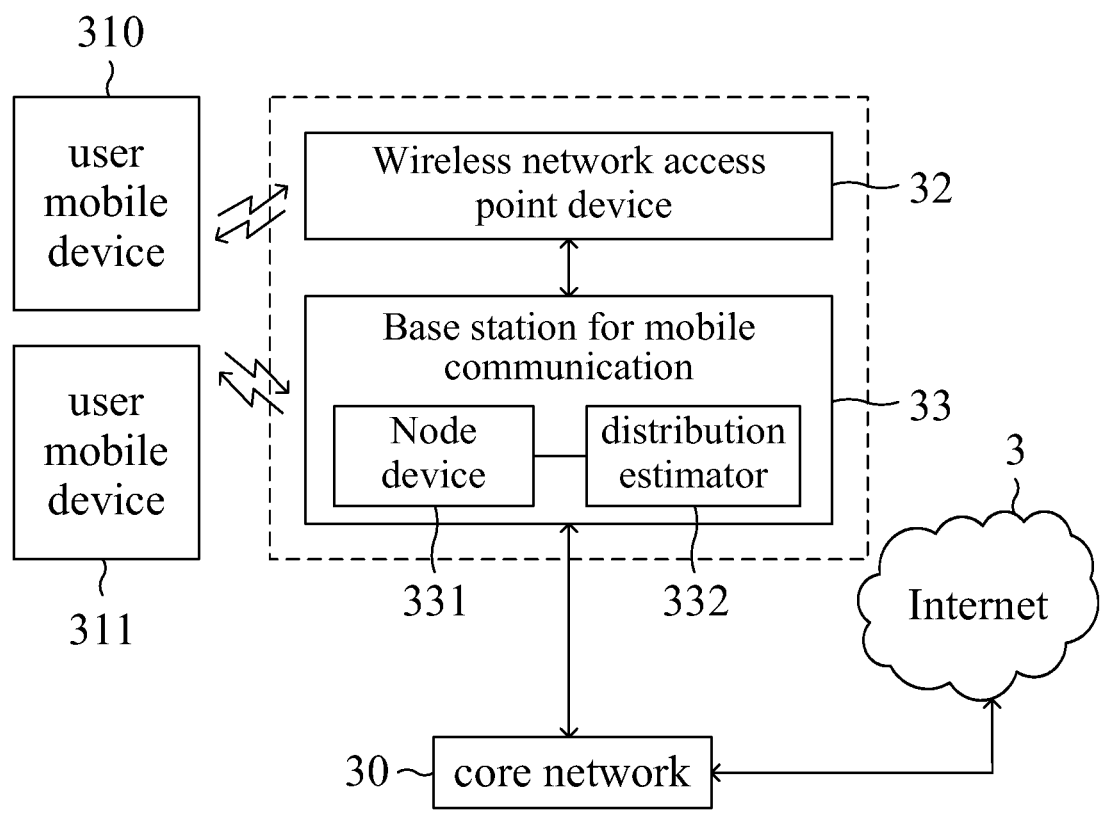
FIG. 3 is a functional block diagram schematically illustrating a heterogeneous LWA network according to an embodiment of the present invention.

Please refer to FIG. 2, which schematically illustrates a flowchart of an aggregating method of communication resources applicable to a heterogeneous network system for mobile communication as illustrated in FIG. 3 according to an embodiment of the present invention. The heterogeneous network system for mobile communication includes at least one wireless network access point device 32, a base station 33 for mobile communication, and at least one user equipment, e.g. user mobile devices 310 and 311. The base station 33 further includes a node device 331 and a distribution estimator 332. When receiving a series of data packets, e.g. in a format of Protocol Data Unit (PDU), from the Internet 3 via a core network 30, the base station 33 executes the following process with the Packet Data Convergence Protocol (PDCP) functioning as the distribution estimator 332.

First of all, the node device 331 of the base station 33 receives a series of data packets and at least one signal intensity information (Step 21; FIG. 2). The signal intensity information indicates the intensity of a signal received and measured by a specified user mobile device from the wireless network access point device located within the coverage range of the base station 33. The base station 33 identifies the communication address of each data packet, which directs to the user mobile device or a specified one of multiple user mobile devices registered in the base station 33. For example, two user mobile devices 310 and 311 are registered in the base station 33. The base station 33 receives a first signal intensity information of the wireless network access point device 32 measured by the user mobile device 310, and a second signal intensity information of the wireless network access point device 32 measured by the user mobile device 311. Alternatively, the signal intensity information may also be picked up from the information stored in the wireless network access point device 32, or captured from another signal transmitted out of the wireless network access point device 32.

Next, Step 22 is executed by the distribution estimator 332 of the base station 33 to estimate if the signal intensity information complies with a specific condition, e.g. the magnitude of the signal intensity information is greater than a default threshold. In other words, in Step 22, whether the signal intensity is high enough for effective communication between the user mobile device 310/311 and the associated wireless network access point device 32 or not is determined. If the magnitude of the first signal intensity information is greater than the default threshold, it means the wireless network access point device 32 is capable of share the burden of data transmission between the user mobile device 310 and the base station 33. Likewise, if the magnitude of the second signal intensity information is greater than the default threshold, it means the wireless network access point device 32 is capable of share the burden of data transmission between the user mobile device 311 and the base station 33. Under the circumstances, the LWA operating function is ready to be started, and Step 23 is entered. In contrast, if the magnitude of the signal intensity information is not greater than the default threshold, it may be determined that the wireless network access point device is too far way from the user mobile device to have a strong signal suitable for the LWA operating function. As a result, the LWA operating function will not be started, and the flow goes back to Step 22 to continue monitoring the signal intensity information.

Subsequently, the status of data packet transmission is monitored to determine the timing for executing the LWA operating function. In this embodiment, as shown in Step 23, whether the status of the data packet transmission complies with a specific condition is determined. For example, whether the amount of data packet transmission within a specified period of time, i.e. the data packet transmission rate, to be transferred to the specified user mobile device by the base station exceeds a default threshold is determined. When the amount of data packets to be transferred to the user mobile device exceeds the default threshold, the LWA operating function will be executed, following Step 24. Otherwise, go back to Step 22 to keep monitoring. In Step 24, the data packets are partially assigned to the user mobile device and partially assigned to the base station, respectively. For example, a first portion of data packets are transferred to the user mobile device with the specified communication address by the base station 33, while a second portion of data packets are transferred to the user mobile device with the specified communication address by the wireless network access point device 32. Alternatively, the data packets may be divided into more than two portions, and transferred by the base station and the wireless network access point device alternately.

On a condition that a plurality of wireless network access point devices are located within the coverage range of the base station 33, the magnitudes of the signal intensity information of respective wireless network access point devices measured by each of the user mobile devices are compared with the default threshold in Step 22. Afterwards, when the LWA operating function is determined to be executed in Step 23, the data packets are divided into portions based on the count of wireless network access point devices complying with the signal intensity requirements, and the divided portions of the data packets are transferred to the specified mobile device from the base station and the wireless network access point devices, respectively. In other embodiments, further conditions are introduced to determine whether the LWA operating function is suitable to be started or not. For example, counts of user mobile devices having registered in respective wireless network access point devices are also taken into account. The less the count, the better the condition to share the burden. Generally speaking, it is preferred to pick up a wireless network access point device involving a high signal intensity and a low count of user mobile devices.

As described above, according to the present invention, the timing for starting the LWA operating function between a specified user mobile device and the heterogenous system can be dynamically determined. As a result, only the user mobile device which really requires a large amount of data transmission would execute the LWA operating function, thereby making good use of the bandwidth resource.

In the LTE protocol, the PDCP protocol is used for processing data. According to the present invention, the PDCP protocol functions as the distribution estimator 332 for selectively transmitting data through either or both of an original LTE transmission path and an additional WLAN transmission path. Hereinafter, the present invention will be described in more detail from the view of signal transmission protocol and signal transmission layers, as illustrated in FIG. 4A-4F. Take the communication among the user mobile device 310, the wireless network access point device 32 and the base station 33 as an example. Once it is determined that the signal intensity of the wireless network access point device 32 measured by the user mobile device 310 is high enough, whether to start the LWA operating function for the user mobile device 310 is checked as follows.

Figure 4A:
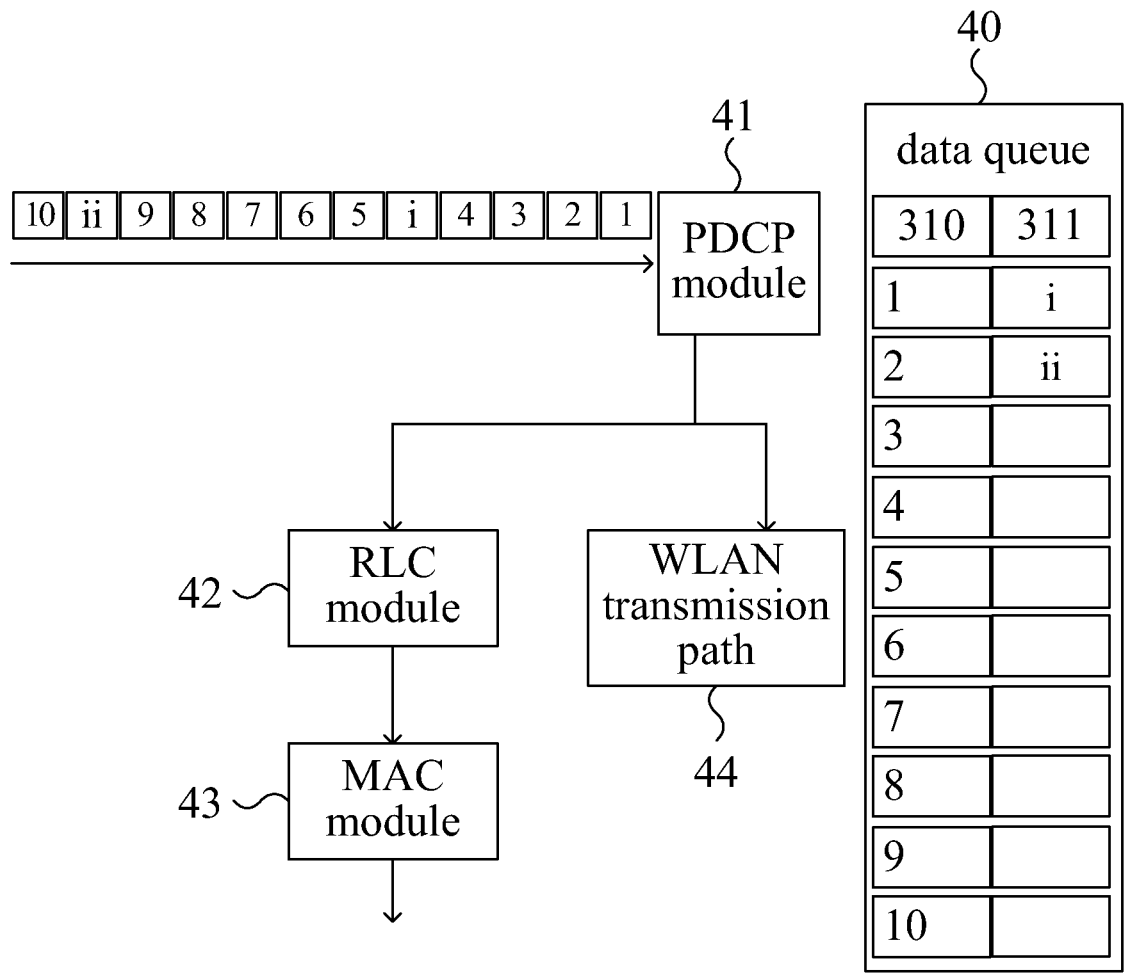
FIGS. 4A-4F are schemes sequentially illustrating steps of an exemplified data transmission process of a heterogeneous LWA network according to an embodiment of the present invention.
Figure 4B:
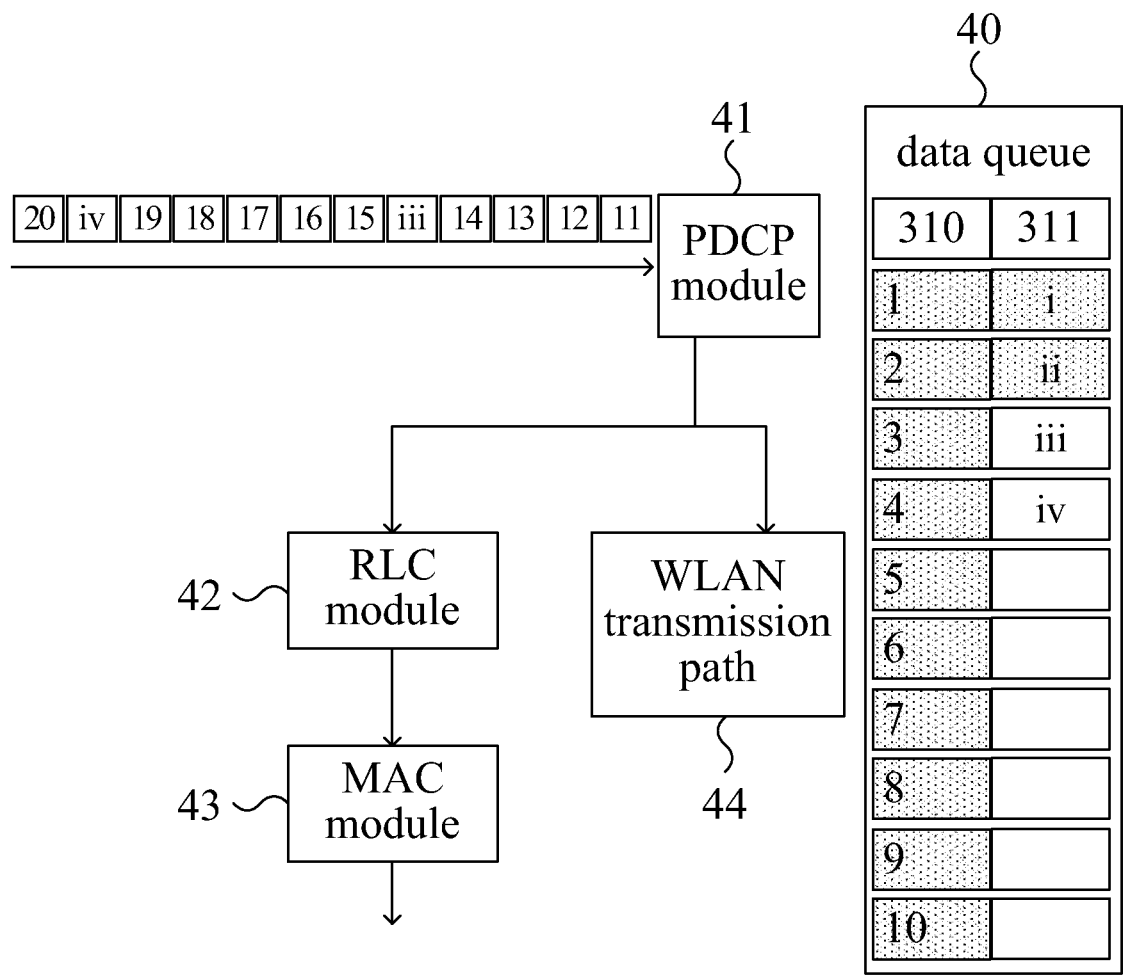

FIG. 4A is a scheme illustrating a series of data packets, which are directed to two specified communication addresses and transmitted to the base station 33 via the Internet 3 and the core network 30. The series of data packets, e.g. in a format of PDU, are received by the PDCP module 41 running in the base station 33, and then stored and ordered as a data queue 40. The data packets numbered 1, 2, 3 . . . , 10 are the ones to be transferred to the user mobile device 310, and the data packets numbered i and ii are the ones to be transferred to the user mobile device 311. The accumulated data packet number and data transmission rate are estimated. For example, by estimating the time duration T1 from the receiving time of the packet 1 to the receiving time of the packet 10, and comparing the time duration T1 with a default threshold T, e.g. 1 second, the status of data transmission can be determined. If T1 is greater than T, it means that the data packets are generated loosely, so the data transmission rate is relatively low. Therefore, the accumulated data packet number is recounted, as illustrated in FIG. 4B. That is, a time duration T2 from the receiving time of the packet 11 to the receiving time of the packet 20 is estimated. Please be noted that in FIG. 4B and subsequent FIGS. 4C-4F, the shaded packets, e.g. packets 1-10, i and ii of FIG. 4B, indicate the ones having been transmitted out.

Figure 4C:
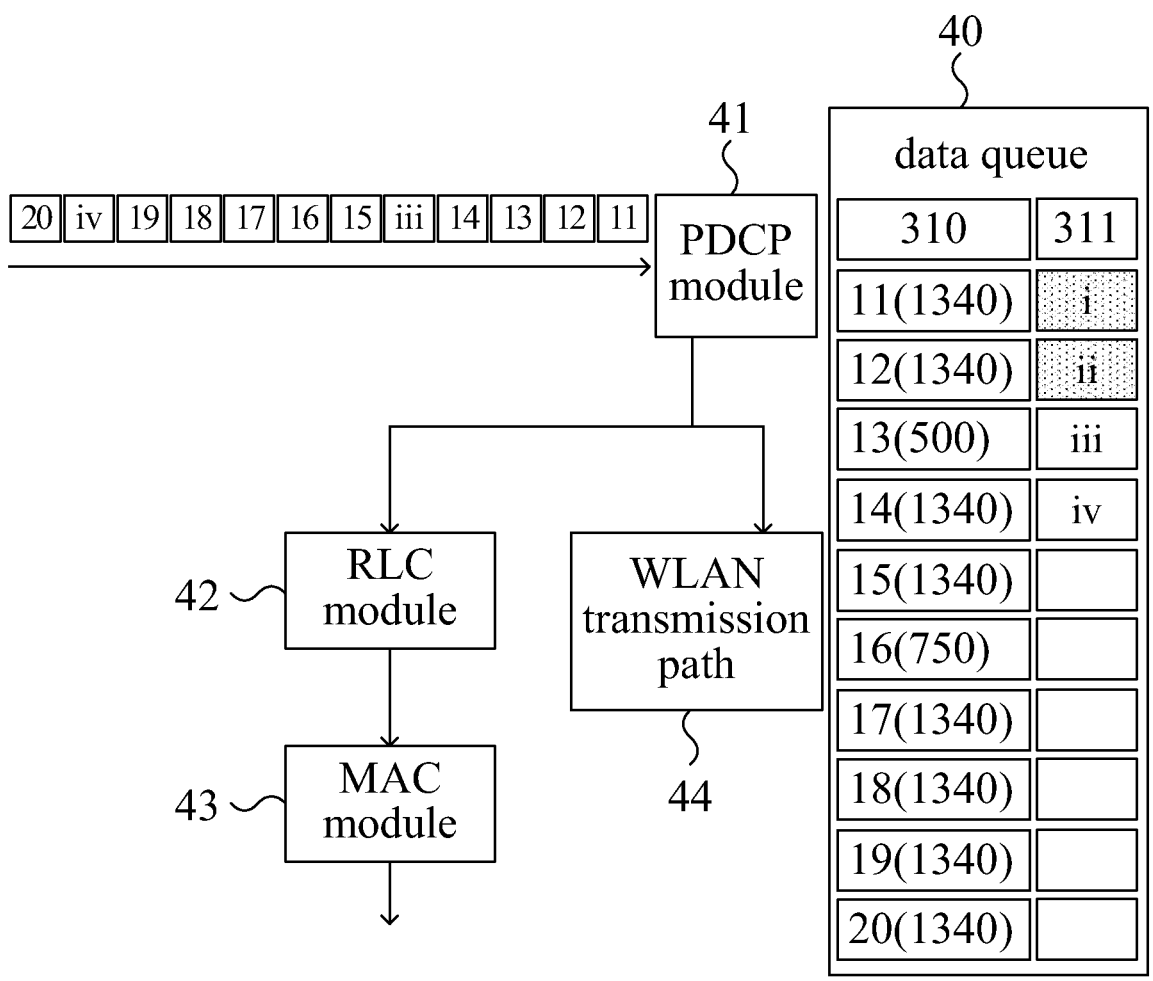
Figure 4D:
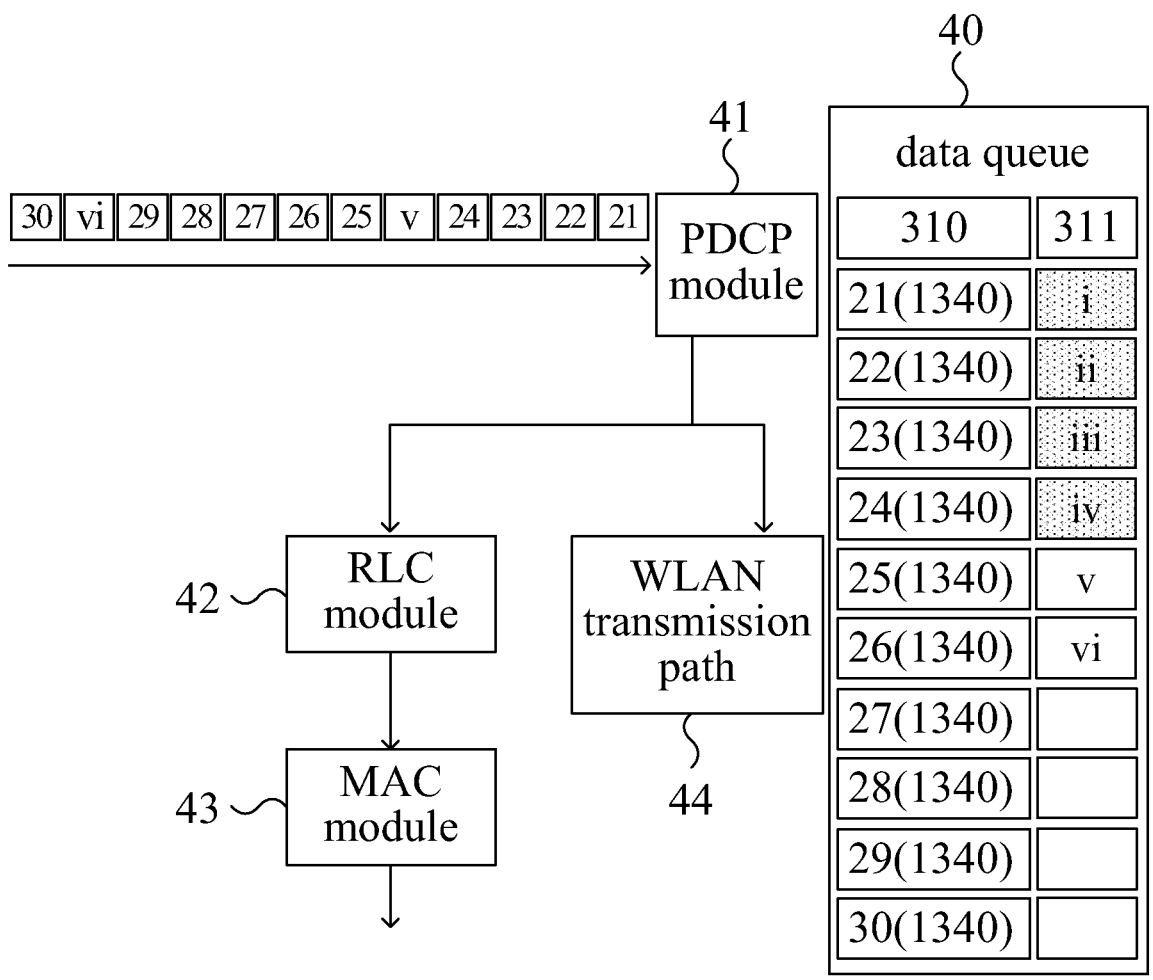

FIG. 4C is a scheme illustrating a case that the time duration T2 from the receiving time of the packet 11 to the receiving time of the packet 20 is less than the default threshold T. Under the circumstances, the sizes of packets are checked and compared with a default threshold, e.g. 1300 bytes. If each of the data packets has a size greater than the default threshold, the LWA operating function will be started. Since the size of at least the packet 13 is less than 1300 bytes in this example, it is still not necessary to start the LWA operating function. Instead, the accumulated data packet number is recounted, as illustrated in FIG. 4D. That is, a time duration T3 from the receiving time of the packet 21 to the receiving time of the packet 30 is estimated.

Figure 4E:
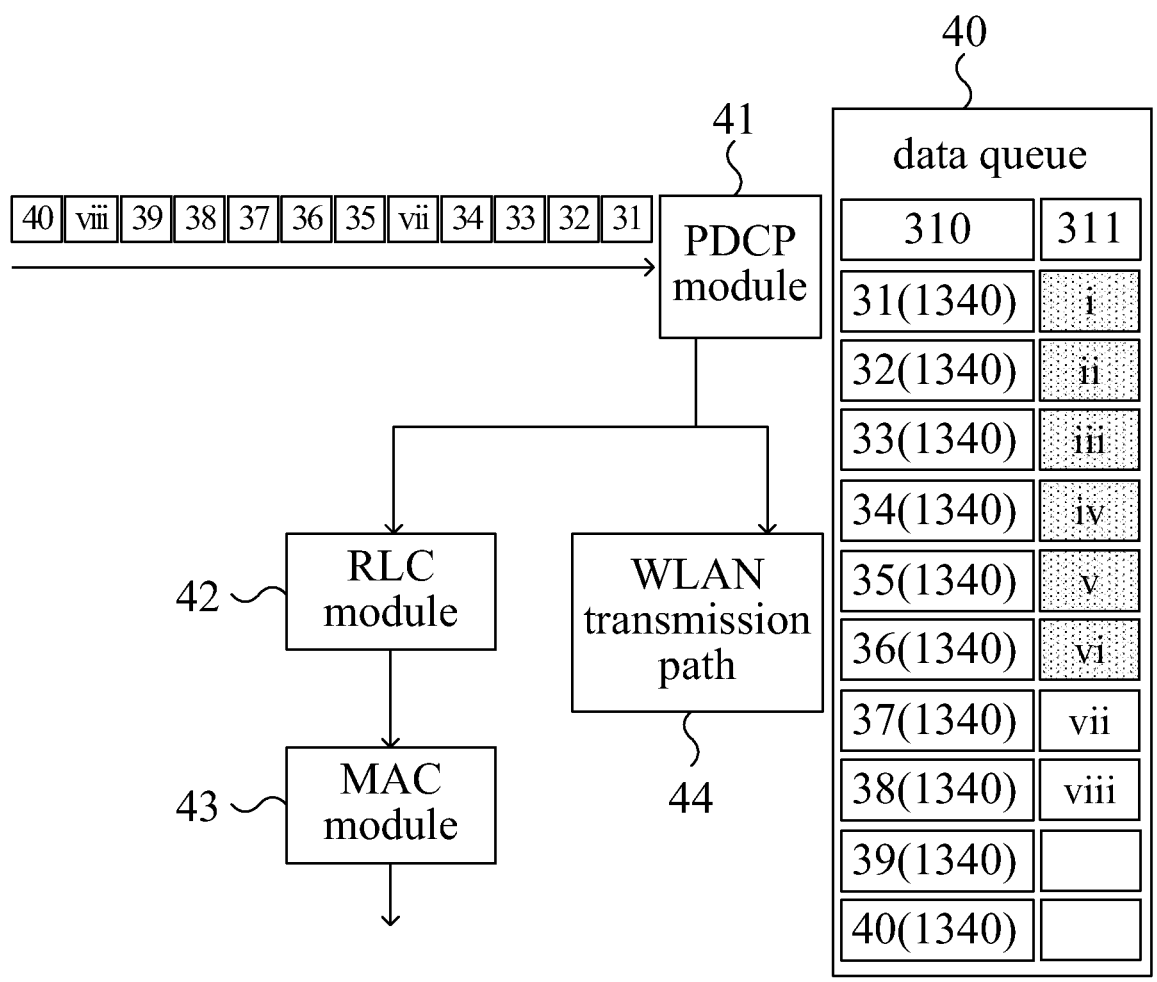

FIG. 4E is a scheme illustrating a case that the time duration T3 from the receiving time of the packet 21 to the receiving time of the packet 30 is less than the default threshold T, and each of the data packets has a size greater than the default threshold. Under the circumstances, the LWA operating function can be started, and the monitoring operation of the data packet transmission rate associated with the user mobile device 310 can be suspended. On the other hand, since the number of the data packets, e.g. 8, to be transferred to the user mobile device 311 has not reached the maximum amount 10 of the data queue, the status of data transmission associated with the user mobile device 311 is continuously monitored in a similar way described above, no matter if the LWA operating function for the user mobile device 310 is started.

Figure 4F:
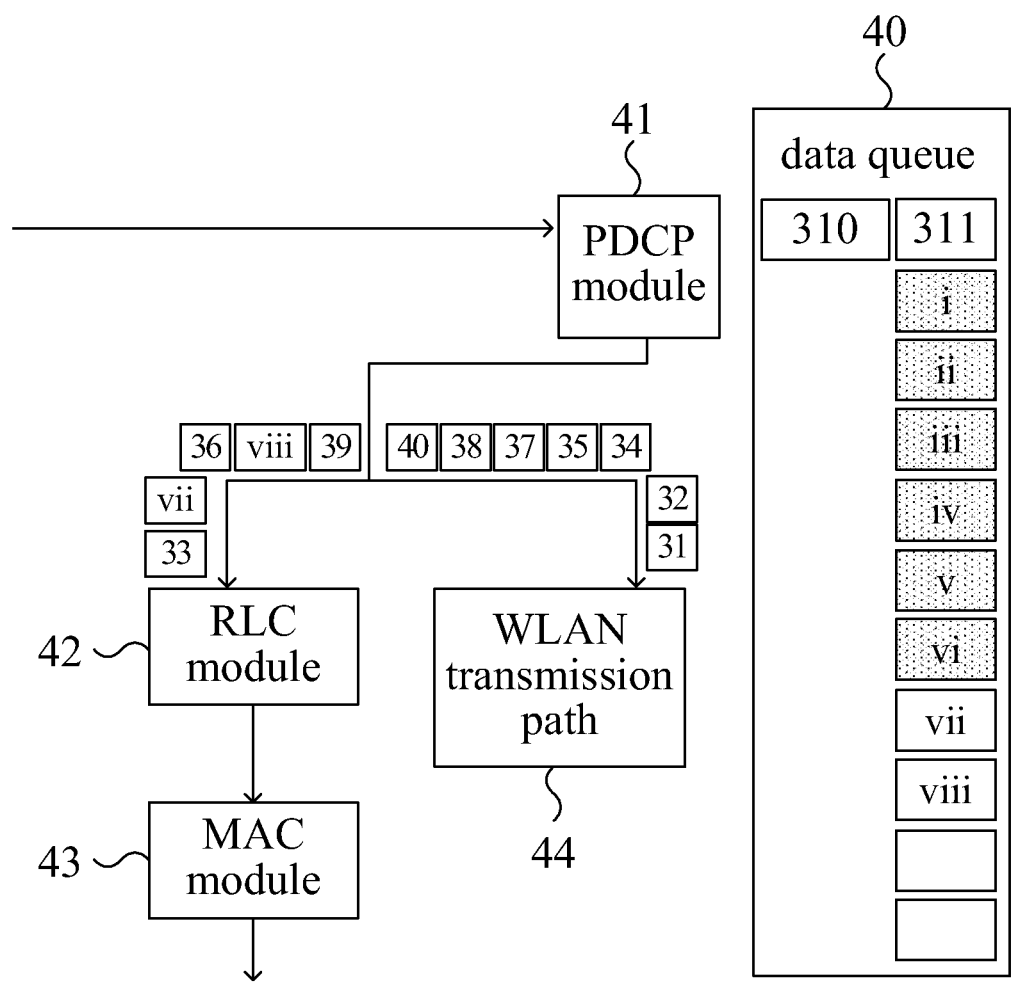

FIG. 4F is a scheme illustrating distribution of data packets after the LWA operating function is started. In this example, one portion of data packets, e.g. packets 31, 32, 34, 35, 37, 38 and 40 are transferred to the user mobile device 310 via the WLAN transmission path 44, and the other portion of data packets, e.g. packets 33, 36 and 39, are transferred to the user mobile device 310 via the conventional LTE transmission path including a radio link control (RLC) module 42 and a media access control (MAC) module 43. With regards to the data packets i-viii to be transferred to the user mobile device 311, since the number of data packets in the queue has not reached the maximum capacity 10, and packets i-vi have been transmitted out while packets vii and viii are still in process, the data packets vii and viii will be transferred to the user mobile device 311 via the conventional LTE transmission path. In this way, data packets encountering an inefficient data transmission status can be efficiently transmitted by making good use of the communication resources. It is to be noted that the above examples described with reference to FIG. 4A to FIG. 4F are for illustration only. The numbers of user mobile devices and wireless network access point device, the default threshold values of time duration and packet size, and the number of portions of data packets to be differentially transferred may vary with practical requirements.

It can thus be understood from the above examples that whether the status of data transmission associated with the user mobile device complies with the specific condition is determined by checking if a time duration from a receiving time of a first one of the series of data packets, e.g. Packet No. 1, to a receiving time of a second one of the series of data packets, e.g. Packet No. 10, is less than a default threshold, and meanwhile, each of the data packets received at and between the first one and the second one has a volume greater than a default threshold. When the time duration from the receiving time of the first one of the series of data packets, e.g. Packet No. 1, to the receiving time of the second one of the series of data packets, e.g. Packet No. 10, is not less than the default threshold or at least one of the data packets received at and between the first one and the second one has a volume smaller than the default threshold, further comprising a step of determining whether another time duration from a receiving time of a third one of the series of data packets, e.g. Packet No. 11, to a receiving time of a fourth one of the series of data packets, e.g. Packet No. 20, is less than the default threshold, wherein a number of data packets between the third one of the series of data packets, e.g. Packet No. 11, and the fourth one of the series of data packets, e.g. Packet No. 20, is equal to a number of data packets between the first one of the series of data packets, e.g. Packet No. 1, and the second one of the series of data packets, e.g. Packet No. 10. Similar discussion can be applied by checking a time duration between the receiving time of Packet No. 21 and the receiving time of Packet No. 30. It is to be noted that the first one, second one, third one and fourth one of the series of data packets do not have to be contiguous as described in the above examples. If proper, the third one of the series of data packets may be some packets later than the second one of the series of data packets. For example, the first one, second one, third one and fourth one of the series of data packets may be Packet Nos. 1, 10, 12 and 22, respectively. Alternatively, the third one of the series of data packets may be some packets earlier than the second one of the series of data packets. For example, the first one, second one, third one and fourth one of the series of data packets may be Packet Nos. 1, 10, 8 and 18, respectively.

Furthermore, in the above examples, sizes of data packets are checked to determine whether a specified data transmission status, e.g. the data packets had better be transferred to the corresponding user mobile device by more than one communication resources, is reached. The sizes of data packets are also known as lengths or volumes of data packets. However, other indices may be referred to determine whether the data transmission status requires more than one communication resources according to the present invention.

Figure 5:
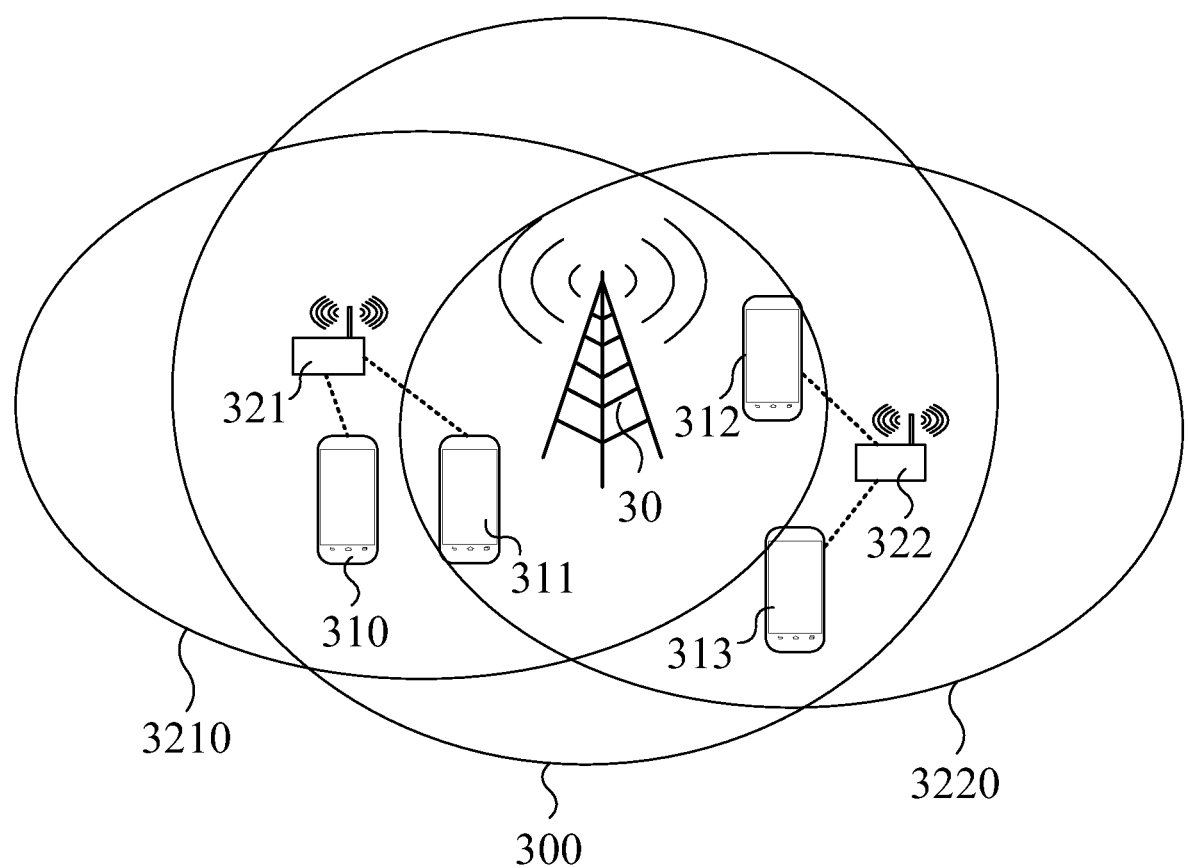
FIG. 5 is a scheme illustrating a communication system developed according to another embodiment of the present invention.

When there is more than one wireless network access point device, e.g. devices 321 and 322, which are available in the coverage range 300 of the base station 33, and have coverage ranges 3210 and 3220 to communicate with user mobile devices 310, 311, 312 and 313, as exemplified in FIG. 5, the additional mobile communication resources 321 and 322 may be adaptively allocated to the user mobile devices 310, 311, 312 and 313 based on the signal intensity information of the wireless network access point devices measured by respective user mobile devices 310, 311, 312 and 313 and counts of the user mobile devices having been registered in respective wireless network access point devices. Generally speaking, it is preferred to pick up a wireless network access point device involving a high signal intensity and a low count of user mobile devices to share the burden of data transmission. Details of the allocation method of communication resources may refer to a copending U.S. Patent Application claiming priority from a U.S. patent application No. 107134192.

It is understood from the above descriptions that according to the present invention, the LWA operating function can be started at a proper timing to cooperatively transmit data packets through available paths. Therefore, the data transmission efficiency of the whole system can be optimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data transmission process of a heterogeneous LWA network for use with at least a user mobile device, at least a wireless network access point device, and a base station device for mobile communication, the process comprising:
   receiving a series of data packets and a signal intensity information, wherein a communication address of each of the series of data packet is directed to the user mobile device, and the signal intensity information indicates an intensity of a signal transmitted between the user mobile device and the wireless network access point device;
   determining whether to start an LWA operating function according to the signal intensity information and a status of data transmission associated with the user mobile device; and assigning partial data packets to be transferred to the user mobile device by the wireless network access point device, and assigning partial data packets to be transferred to the user mobile device by the base station device when the LWA operating function is started, wherein the LWA operating function is started when the intensity of the signal is greater than a default threshold and a time duration from a receiving time of a first one of the series of data packets to a receiving time of a second one of the series of data packets is less than a default threshold, and meanwhile, each of the data packets received at and between the first one and the second one has a size greater than a default threshold.

2. The process according to claim 1, wherein when the time duration from the receiving time of the first one of the series of data packets to the receiving time of the second one of the series of data packets is not less than the default threshold or at least one of the data packets received at and between the first one and the second one has a size smaller than the default threshold, whether another time duration from a receiving time of a third one of the series of data packets to a receiving time of a fourth one of the series of data packets is less than the default threshold is determined, wherein a number of data packets between the third one of the series of data packets and the fourth one of the series of data packets is equal to a number of data packets between the first one of the series of data packets and the second one of the series of data packets.

3. The process according to claim 1, wherein the series of data packets are transferred to the user mobile device by the base station device if the LWA operating function is not started.

4. The process according to claim 1, wherein the series of data packets are transferred to the user mobile device by the base station device if the LWA operating function is not started.

5. The process according to claim 1, wherein the step of assigning partial data packets to be transferred to the user mobile device by the wireless network access point device, and assigning partial data packets to be transferred to the user mobile device by the base station device is conducted by assigning a first portion of data packets to be transferred to the user mobile device by the wireless network access point device, and assigning a subsequent second portion of data packets to be transferred to the user mobile device by the base station device.

6. The process according to claim 5, wherein after the second portion of data packets is assigned to be transferred to the user mobile device by the base station device, a subsequent third portion of data packets is assigned to be transferred to the user mobile device by the wireless network access point device, and a further subsequent fourth portion of data packets is assigned to be transferred to the user mobile device by the base station device.

7. The process according to claim 5, wherein after the second portion of data packets is assigned to be transferred to the user mobile device by the base station device, a subsequent third portion of data packets is assigned to be transferred to the user mobile device by another wireless network access point device, which is in communication with the base station and the user mobile device, and has a signal intensity information complying with the first specific condition.

8. A base station for mobile communication for use with at least one user mobile device and at least one wireless network access point device, comprising:

a node device in communication with the Internet, the user mobile device and the wireless network access point device, receiving a series of data packets and a signal intensity information, wherein a communication address of each of the series of data packet is directed to the user mobile device, and the signal intensity information indicates an intensity of a signal transmitted between the user mobile device and the wireless network access point device; and a distribution estimator in communication with the node device and the wireless network access point device, determining whether the signal intensity information complies with a first specific condition and a status of data transmission associated with the user mobile device complies with a second specific condition or not, wherein partial data packets are assigned to be transferred to the user mobile device by the wireless network access point device, and partial data packets are assigned to be transferred to the user mobile device by the base station device if the signal intensity information complies with the first specific condition and the status of data transmission associated with the user mobile device complies with the second specific condition, and wherein the distribution estimator determines that the signal intensity information complies with the first specific condition when the intensity of the signal is greater than a default threshold, and determines that the status of data transmission associated with the user mobile device complies with the second specific condition when a time duration from a receiving time of a first one of the series of data packets to a receiving time of a second one of the series of data packets is less than a default threshold, and meanwhile, each of the data packets received at and between the first one and the second one has a size greater than a default threshold.

9. The base station according to claim 8, when the time duration from the receiving time of the first one of the series of data packets to the receiving time of the second one of the series of data packets is not less than the default threshold or at least one of the data packets received at and between the first one and the second one has a size smaller than the default threshold, further comprising a step of determining whether another time duration from a receiving time of a third one of the series of data packets to a receiving time of a fourth one of the series of data packets is less than the default threshold, wherein a number of data packets between the third one of the series of data packets and the fourth one of the series of data packets is equal to a number of data packets between the first one of the series of data packets and the second one of the series of data packets.

10. The base station according to claim 8, wherein the series of data packets are transferred to the user mobile device by the base station device if the status of data transmission associated with the user mobile device does not comply with the second specific condition.

11. The base station according to claim 8, wherein the step of assigning partial data packets to be transferred to the user mobile device by the wireless network access point device, and assigning partial data packets to be transferred to the user mobile device by the base station device is conducted by assigning a first portion of data packets to be transferred to the user mobile device by the wireless network access point device, and assigning a subsequent second portion of data packets to be transferred to the user mobile device by the base station device.

12. The base station according to claim 11, wherein after the second portion of data packets is assigned to be transferred to the user mobile device by the base station device, a subsequent third portion of data packets is assigned to be transferred to the user mobile device by the wireless network access point device, and a further subsequent fourth portion of data packets is assigned to be transferred to the user mobile device by the base station device.

13. The base station according to claim 11, wherein after the second portion of data packets is assigned to be transferred to the user mobile device by the base station device, a subsequent third portion of data packets is assigned to be transferred to the user mobile device by another wireless network access point device, which is in communication with the base station and the user mobile device, and has a signal intensity information complying with the first specific condition.

14. A base station for mobile communication for use with at least one user mobile device and at least one wireless network access point device, comprising:
- a node device in communication with the Internet, the user mobile device and the wireless network access point device, receiving a series of data packets and a signal intensity information, wherein a communication address of each of the series of data packet is directed to the user mobile device, and the signal intensity information indicates an intensity of a signal transmitted between the user mobile device and the wireless network access point device; and
- a distribution estimator in communication with the node device and the wireless network access point device, determining whether the signal intensity information complies with a first specific condition and a status of data transmission associated with the user mobile device complies with a second specific condition or not, wherein a first portion of data packets is assigned to be transferred to the user mobile device by the wireless network access point device, and a second portion of data packets is assigned to be transferred to the user mobile device by the base station device if the signal intensity information complies with the first specific condition and the status of data transmission associated with the user mobile device complies with the second specific condition, and wherein after the second portion of data packets is transferred to the user mobile device by the base station device, a subsequent third portion of data packets is assigned to be transferred to the user mobile device by the wireless network access point device, and a further subsequent fourth portion of data packets is assigned to be transferred to the user mobile device by the base station device.

15. A data transmission process of a heterogeneous LWA network for use with at least a user mobile device, at least a wireless network access point device, and a base station device for mobile communication, the process comprising:
- receiving a series of data packets and a signal intensity information, wherein a communication address of each of the series of data packet is directed to the user mobile device, and the signal intensity information indicates an intensity of a signal transmitted between the user mobile device and the wireless network access point device; and
- assigning partial data packets to be transferred to the user mobile device by the wireless network access point device, and assigning partial data packets to be transferred to the user mobile device by the base station device on a first condition that the intensity of the signal is greater than a default threshold and on a second condition that a time duration from a receiving time of a first one of the series of data packets to a receiving time of a second one of the series of data packets is less than a default threshold.

16. The process according to claim 15, wherein the step of assigning partial data packets to be transferred to the user mobile device by the wireless network access point device, and assigning partial data packets to be transferred to the user mobile device by the base station device is conducted on the first condition, the second condition, and a third condition that each of the data packets received at and between the first one and the second one has a size greater than a default threshold.

* * * * *